Figure 1:
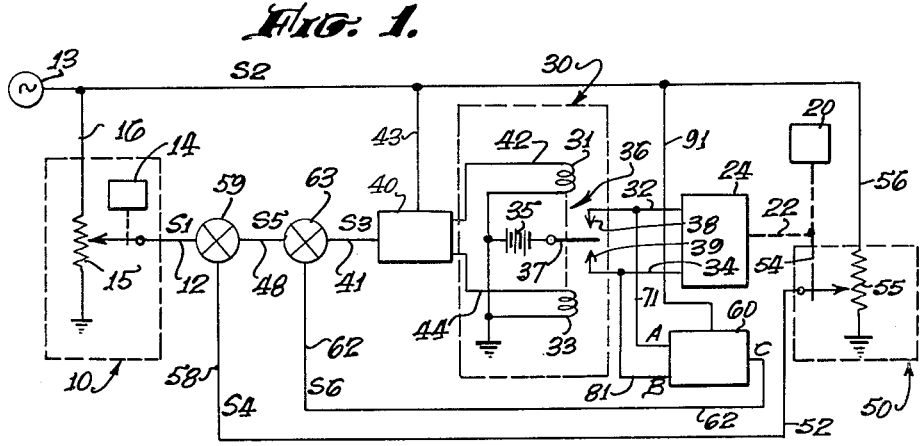

Aug. 7, 1962 R. C. HOWARD 3,048,759
STABILIZED SERVOMECHANISM
Filed Aug. 29, 1960 2 Sheets-Sheet 1

ROBERT CHARLES HOWARD,
INVENTOR.

BY
Barkeley + Lewis

Aug. 7, 1962  R. C. HOWARD  3,048,759
STABILIZED SERVOMECHANISM
Filed Aug. 29, 1960  2 Sheets-Sheet 2

ROBERT CHARLES HOWARD,
INVENTOR.

BY
Barbelew + Lewis

United States Patent Office 3,048,759
Patented Aug. 7, 1962

3,048,759
STABILIZED SERVOMECHANISM
Robert Charles Howard, Costa Mesa, Calif., assignor to Giannini Controls Corporation, Duarte, Calif., a corporation of New York
Filed Aug. 29, 1960, Ser. No. 52,649
7 Claims. (Cl. 318—448)

This invention concerns servomechanisms in which the power for driving the controlled device is turned on and off by switching action.

Servomechanisms with on-off drive are difficult to stabilize when they have combined properties of high performance and high resolution. In the absence of any proportional region in the switching device, it is difficult, without sacrificing resolution, to provide sufficient damping to make the servo loop stable.

A primary object of the present invention is to provide a relatively simple and effective stabilizing system for servo controllers of the described type. The stabilizing system of the invention acts as a simulated Lanchester damper for small displacements, and gives simulated tachometer action for large displacements.

In one of its aspects, the invention is particularly useful in connection with servo systems in which the control signal is an alternating current voltage. In that aspect, the invention provides an alternating current stabilizing signal having a definite phase relation to the initial alternating current control signal of the servo system. That stabilizing signal is developed under control of the output switching mechanism, and is combined directly with the input signal. The resulting modified signal is utilized as control signal in the amplifier.

That novel arrangement has the advantage that the amplifier itself is not required to be specially designed, but may be of conventional type. A further advantage is that the characteristics of the stabilizing signal can be controlled and modified more flexibly and conveniently than in previous systems. In particular, the stabilizing signal may be caused to vary continuously in magnitude in a manner that depends not only upon the action of the switching mechanism at the moment, but upon its past action. For example, the magnitude of the stabilizing signal may increase with a selected time constant following switch actuation, and may decrease with a different selected time constant following switch deactuation.

A further aspect of the invention is useful in connection with both alternating and direct current systems. An important advantage of that aspect of the invention is that the stabilizing signal associated with drive in one direction not only decreases the effective sensitivity of the system with respect to drive in that direction, but also increases the effective sensitivity with respect to drive in the other direction. That dual action causes marked improvement in performance, particularly in rapid braking of the controlled device as null position is approached following a large deflection.

Stabilizing systems for servo controllers have previously been described in which the switching mechanism that controls the output power also supplies to the servo amplifier a direct current stabilizing signal that changes the bias condition of the amplifier and thereby reduces its sensitivity. In some instances, typified by United States Patents 2,425,733 and 2,534,801, the stabilizing signal desensitizes the amplifier uniformly with respect to both directions of drive of the controller. In other previous systems, typified by Patents 2,454,401 and 2,475,461, operation of the output drive in one direction desensitizes the amplifier only with respect to that direction of drive. Neither type of previous system is capable of producing the dual action provided by the present invention.

A full understanding of the invention, and of its further objects and advantages, will be had from the following description of certain illustrative embodiments. The particulars of that description, and of the drawings which form a part of it, are intended only as illustration, and not as a limitation upon the scope of the invention, which is defined in the appended claims.

Figure 2:
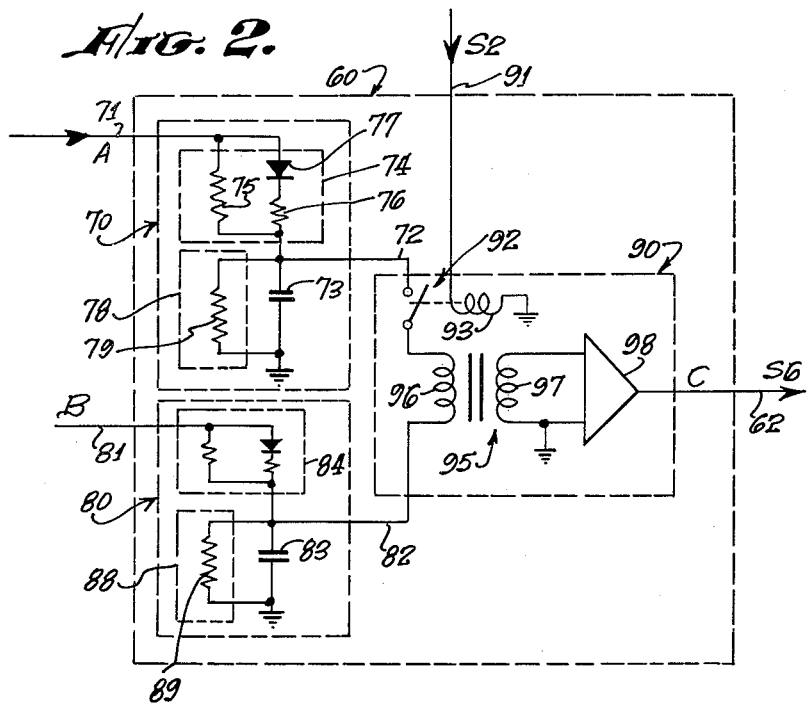
Figure 3:
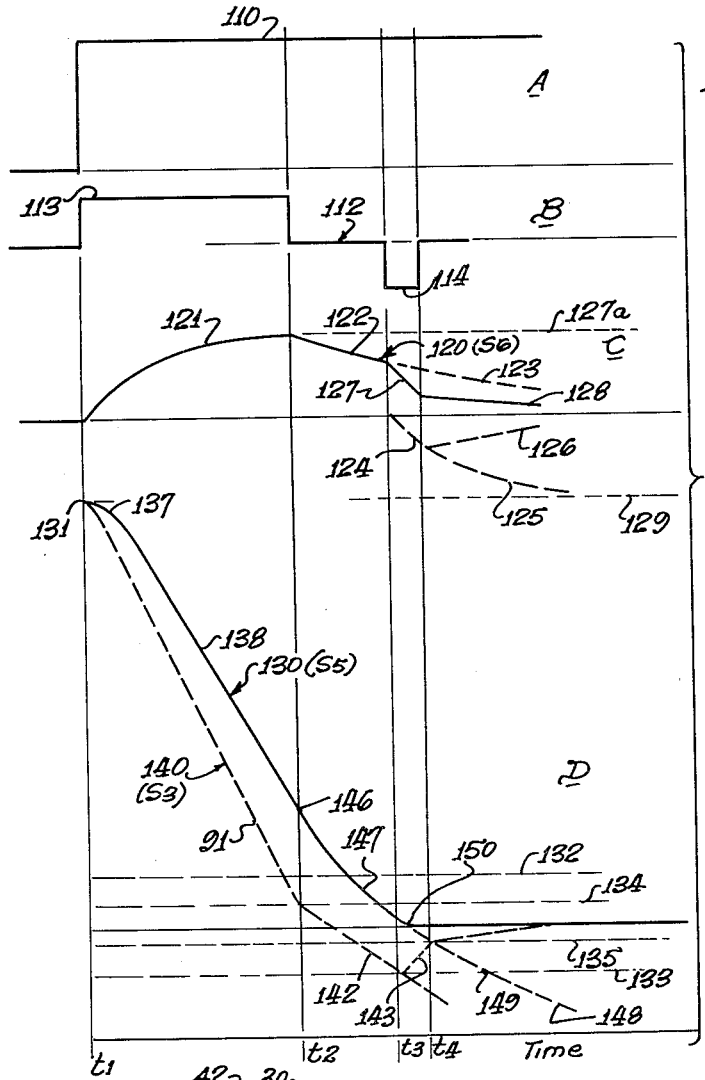
Figure 4:
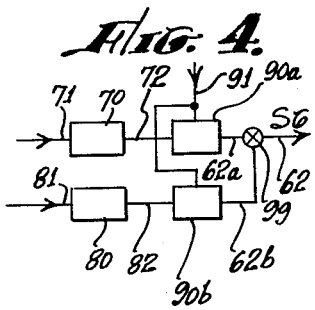
Figure 5:
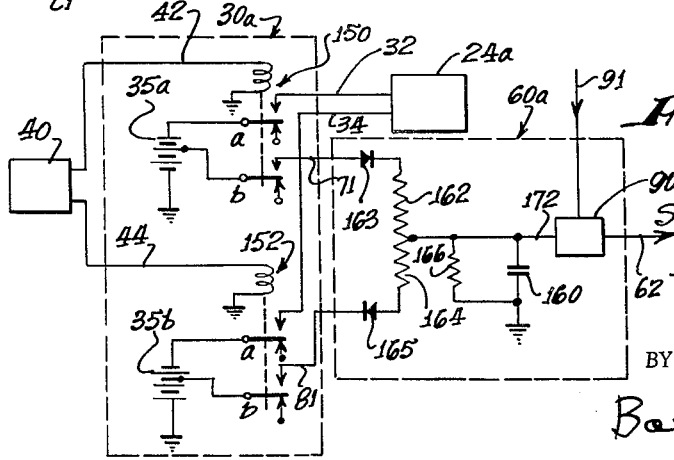

In the drawings:
FIG. 1 is a schematic drawing representing an illustrative system in accordance with the invention;
FIG. 2 is a schematic drawing representing further illustrative detail of a portion of the system of FIG. 1;
FIG. 3 is a series of graphs illustrating typical operation of a system in accordance with the invention;
FIG. 4 is a schematic diagram representing a modification; and
FIG. 5 is a schematic diagram representing a further modification.

The servo controller represented schematically in FIG. 1 drives an output device or member, indicated schematically at 20, in accordance with an input command signal S1 received on line 12 from a suitable transducer 10. That signal, which may be of either direct or alternating current type, represents the desired position for output device 20. In the present embodiment, signal S1 comprises an alternating current voltage, distance being represented by the signal amplitude and direction being represented by the signal phase with respect to a reference frequency. Such a signal may be developed by a wide variety of known devices, including, for example, synchros and differential transformers. Signal generator 10, as illustratively shown, comprises a potentiometer 15 having one end of its winding grounded and the other end supplied via the line 16 with an alternating current reference voltage S2 from a suitable source represented at 13. The brush of potentiometer 15 is driven by any desired type of command device. The device shown schematically at 14 may represent, for example, a manual handle or an instrument that responds automatically to some physical variable such as pressure, temperature, acceleration or the like. The alternating current command signal S1 tapped on line 12 is then in phase with reference carrier 13. Its magnitude is proportional to the brush distance from the grounded end of the potentiometer winding, and may be considered to represent the desired position of output device 20. That device may comprise, for example, a control element of an aircraft or missile, or any member that is to be positioned or driven under control of command device 14.

The actual drive of output device 20 is accomplished via drive coupling 22 by power drive means indicated schematically at 24. Drive mechanism 24 may comprise any desired type of electrically controlled reversible power device, such, for example, as a reversible electric motor and gear mechanism, or hydraulic motor means with suitable electrically actuated control valves. Drive mechanism 24 is controlled by switching means represented generally at 30, which supplies actuating power to the drive mechanism selectively via the line 32 or 34 to produce drive in respective directions, which will be referred to for clarity of description as forward and reverse drive, respectively. That switching action may be accomplished in many different ways, including, for example, electronic circuits of known type and a wide variety of known electromagnetic relay and contacter devices. As illustratively shown, switching device 30 comprises a single switch 36 of neutral center type. Switch armature 37 is normally in open position, as drawn, and is shiftable to engage the contact 38 or 39 in response to respective energization of winding 31 or 33. Electrical power, which may be either alternating or direct current, is thereby applied from a suitable source, shown schematically as the battery 35, to either line 32 or 34. That power may constitute the primary input power to drive mechanism 24; or may constitute an energizing signal for controlling application of power that is available as a part of that mechanism.

The action of switching device 30 is controlled, in turn, by the servo amplifier 40, which may be of conventional type. Amplifier 40 receives an alternating current control signal S3 via the line 41, and receives the reference frequency S2 from 13 via the line 43. Amplifier 40 includes phase-sensitive detection circuitry, and produces a switch-actuating output voltage on either the line 42 or the line 44 when signal S3 exceeds a definite threshold magnitude; the signal being typically on line 42 when S2 and S3 are in phase, and on line 44 when they are of opposite phase.

The servo loop is typically closed by a feedback signal S4 developed on the line 52 by transducer means 50 in response to movement of output device 20. As shown, transducer 50 comprises a potentiometer 55 which has one end of its winding grounded and the other end supplied via the line 56 with reference voltage S2. The potentiometer brush is driven with output device 20, as by coupling mechanism represented schematically at 54, which may be linked directly with output drive coupling 22. The alternating current signal tapped by the potentiometer brush is supplied as feed back signal S4 to the line 52 and represents the actual position of output device 20 in the same sense that command signal S1 represents the desired position of that device.

Feedback signal S4 is subtracted from command signal S1 by a differential device of any suitable type, indicated schematically at 59. The resulting error signal S5 on the line 48 thus represents the actual deviation of output device 20 from the command position. That error signal on line 48 would ordinarily be supplied directly to line 41 and utilized as input or control signal for servo amplifier 40. When S4 is less than S1, error signal S5 is in phase with reference frequency S1, and would cause forward drive of output device 20. When S4 exceeds S1, S5 is 180° out of phase with S1, and would produce reverse drive of 20.

In accordance with the present invention, error signal S5 is further modified in a novel and distinctive manner before its utilization for controlling amplifier 40 and switching means 30. That modification comprises addition, with attention to phase, of an alternating current stabilizing signal S6. As illustratively shown, stabilizing signal S6 is developed on the line 62 by circuit means indicated schematically at 60; and is combined with error signal S5 by the differential device 63. The resulting modified signal is supplied via line 41 to amplifier 40, and constitutes control signal S3, already mentioned.

Stabilizing circuitry 60 develops the alternating current stabilizing signal S6 under control of the output signal from amplifier 40, and in definite time relation to the action of switching mechanism 30. That is typically accomplished by modulation of the reference frequency S2 from source 13 under control of switching mechanism 30.

Stabilizing signal S6 may be considered to comprise two components which differ in phase by 180°. They will be referred to as the forward and reverse components of that signal, and will be denoted F and R, respectively. They are typically in phase and 180° out of phase, respectively, with respect to reference frequency S2. Components F and R of stabilizing signal S6 typically vary independently of each other, forward component F being controlled by operation of switch armature 37 to forward contact 38, and reverse component R being controlled by switch operation to reverse contact 39. Each of the signal components is so employed that it has the effect of decreasing the effective system sensitivity with respect to drive in the corresponding direction and of increasing the effective system sensitivity with respect to drive in the opposite direction. Whereas one of the components alone may suffice under certain special conditions, for example in a servo system that drives predominantly in one direction, it is ordinarily preferred to provide and utilize both components. Accordingly, circuitry 60 typically comprises two distinct channels which control development of the respective signal components, and means for combining the output of those channels to produce the complete stabilizing signal S6.

As illustratively shown in FIG. 2, stabilizing circuitry 60 comprises the forward and reverse channels 70 and 80, respectively, which are controlled by input voltages received via the respective lines 71 and 81, and which develop output voltages on the respective lines 72 and 82. Circuitry 60 further comprises modulating means represented at 90 for combining the latter two voltages to form a single control voltage; and for modulating the reference frequency S2, received via the line 91, in accordance with that control voltage. The resulting modulated voltage is delivered as stabilizing signal S6 to line 62.

Channels 70 and 80 comprise respective energy storage devices, shown as the capacitances 73 and 83, in which energy is stored in response to closure of switch 36 to the respective contacts 38 and 39, and from which energy is released in response to opening of those contacts. Output lines 72 and 82 from channels 70 and 80 are connected to the ungrounded terminals of the respective capacitances 73 and 83 and receive the direct current voltages standing thereon.

Input lines 71 and 81 are connected to switch contacts 38 and 39 respectively, as shown in FIG. 1, so that forward and reverse closure of switch 36 supplies the voltage of power source 35 as input voltage to channels 70 and 80, respectively. If source 35 supplies alternating current power, suitable rectifying means of conventional type are provided between lines 32 and 71 and between lines 34 and 81, so that lines 71 and 81 receive direct current voltages. The input voltage on line 71, for example, charges capacitance 73 via a charging network indicated generally at 74. Charging network 74 may be of any desired configuration, and may involve active as well as passive elements. As shown illustratively it comprises two parallel branches, one containing the single resistance 75 and the other containing the resistance 76 and the unidirectional device 77 connected in series. Device 77 is typically a semi-conductor diode, and is poled to permit current flow from battery 35 toward capacitance 73.

Channel 70 also includes a circuit network for discharge of capacitance 73 when switch contact 38 is open. Such discharge through resistance 76 is blocked by diode 77; but may take place through resistance 75 and the impedance of power mechanism 30 (FIG. 1), which is typically low. A path for discharge of capacitance 73 may also be provided independently of charging network 74. Such a discharge network is indicated illustratively at 78, comprising the resistance 79 connected in shunt to the capacitance. Discharge network 78 also acts in series with charging network 74 as a voltage divider to modify the maximum voltage to which capacitance 73 is charged. Whereas discharge paths 75 and 79 may be employed to supplement each other, one or other of them may be omitted, especially since it is ordinarily preferable for the capacitance to charge more rapidly than it discharges.

More complex time courses for charging and discharging may be produced, if desired, by means of appropriate networks of known types, which may, for example, include biasing diodes to give other than exponential variation of voltage. In selecting specific charge and discharge networks to give the desired control action, the nature of drive mechanism 24 is to be taken into account. The impedance of that mechanism, or the back electromotive force produced by it may be useful in obtaining the desired action. Alternatively, the signals supplied to channels 70 and 80 may be made independent of such factors, as by the illustrative modification shown in FIG. 5.

Channel 80 is typically, although not necessarily, closely similar or identical to channel 70. For clarity of illustration the channels are shown identical, with corresponding parts denoted by numerals differing by ten units.

In the present embodiment, the output voltages from both channels have the same polarity, determined by battery 35 (FIG. 1). Those voltages are in effect subtracted, and the difference voltage is employed to produce a signal that is summed with error signal S5. If S5 is a direct current signal, it may be summed directly with the voltage difference between lines 72 and 82 or after passing the latter through a suitable isolation amplifier to reduce loading of capacitors 73 and 83. In the present embodiment, wherein command and error signals S1 and S5 are alternating current voltages, the voltage difference between lines 72 and 82 is employed to control modulation of the alternating current reference frequency S2. That modulation may be performed by an suitable type of modulating device, which may, for example, be an electronic or mechanical modulator of known type. As illustrated, reference frequency S2 is supplied via the line 91 to the driving winding 93 of a twitch-type modulator 92. The modulator switch 94 is connected in series with the primary winding 96 of the transformer 95 between lines 72 and 82. Any difference voltage between those lines is thus applied intermittently as input voltage to the transformer at the reference frequency and in definite phase relation thereto. The resulting output from transformer secondary 97 is an alternating current voltage of which the magnitude corresponds to the difference between the two direct current voltages standing on capacitances 73 and 83. Its phase, which may be adjusted if necessary by phase adjusting circuitry of known type, not explicitly shown, differs by either 0° or 180° from S2, depending upon the polarity of the primary voltage. The alternating current voltage from transformer 95 is supplied to line 62 as the stabilizing signal S6 already mentioned. An isolating amplifier or its equivalent may be inserted as indicated at 98 to reduce the loading of the capacitors 73 and 83.

The component of signal S6 that arises from the charge on capacitance 73 in forward channel 70 is the forward component F already referred to; that from capacitance 83 is the reverse component R. If, as in the present embodiment, the summing device 63 (FIG. 1) subtracts the stabilizing signal from error signal S5, the circuitry is so arranged that F is in phase with reference frequency S2 and R is 180° out of phase. The opposite phase relation can be employed, if desired, by replacing differential device 63 by a suitable summing circuit, which may be of conventional type, which adds S5 and S6 to produce control signal S3.

FIG. 3 comprises parts A, B, C and D and illustrates schematically one aspect of typical performance of a stabilized servo system in accordance with the invention. The line 110 in FIG. 3A represents an illustrative command signal S1 which includes a step function occurring at the time t1 and calling for forward drive of the output device through some definite distance. The line 112 in FIG. 3B represents schematically the condition of switch 36, and hence also the condition of drive of mechanism 24. The upward deflection of line 112 at 113 indicates forward drive, starting at time t1 in response to command signal 110 and ending at t2. The downward deflection of line 112 at 114 indicates reverse drive between the times t3 and t4. The primary factors determining those specific times will be explained below.

The solid curve 120 in FIG. 3C represents the voltage difference between lines 72 and 82 (FIG. 2) developed in response to the two drive periods 113 and 114. Curve 120 may also be considered to represent the envelope of the alternating current stabilizing signal S6 developed from that voltage. During forward drive period 113, with switch 35 closed to contact 38, capacitance 73 is charged through charging network 74, as indicated by the rising curve segment 121. That is a generally asymptotic curve, which approaches a definite limit voltage 127a.

That limit voltage may be given any desired value by suitable selection of such factors as the voltage of battery 35 and the voltage dividing action of parallel-connected resistances 75 and 76 and resistance 79. The time constant of charging curve 121 may be determined by suitable selection of the effective resistance of 75 and 76 with respect to the value of capacitance 73.

When switch contact 38 opens at time t2, condenser 73 discharges through network 78, as indicated by the curve segment 122 in FIG. 3C. The time constant of that discharge may be determined as desired by suitable selection of resistance 79 with respect to capacitance 73. That discharge continues after t3, as indicated by the dashed curve 123.

During the reverse drive period 114, capacitance 83 in reverse channel 80 is charged through switch contact 39 and network 84, as indicated by the dashed curve 124 in FIG. 3C. That line is drawn below the abscissa to represent the opposing action of the two stabilizer channels. Curve 124 is projected at 125 beyond t4 for clarity of illustration, although in the present instance the charging current is terminated at the t4 by opening of switch contact 39. Curves 124 and 125 typically correspond directly to curve 121, except for the difference of effective polarity, and approach a definite limit voltage 129. Following t4 the existing charge on capacitance 83 leaks off through network 88, causing the voltage to follow curve 126.

When both capacitances 73 and 83 are at least partially charged, as is true after t3, the net potential between lines 72 and 82 corresponds to the difference of their voltages, and is represented schematically by the solid curve segments 127 between t3 and t4 and 128 after t4. Those curves also represent the envelope of the total stabilizing signal S6. That signal will be seen to be composed of a forward component F (curves 123) and a reverse component R of opposite phase (curves 124 and 126).

In FIG. 3D the solid curve 130 represents both the deviation of output device 20 from the command position and the envelope of the corresponding alternating current error signal S5 on line 48. Signals calling for forward drive are shown as positive values in the graph, reverse signals as negative values. The initial value of error signal S5, immediately after time t1, is determined by the amplitude of input step function 110. That value is represented arbitrarily at 131. Dashed curve 140 in FIG. 4D represents the net control signal S3 supplied to amplifier 40, which equals S5 minus S6. Curve 140 coincides with curve 130 at time t1, when stabilizing signal S6 is zero (FIG. 3C), and deviates from curve 130 in direct proportion to the varying value of S6.

The threshold value for control signal S3, required by amplifier 40 to actuate switch 36 and initiate forward drive, is represented in FIG. 3D by the line 132; that required to initiate reverse drive by the line 133. The dropout signal levels, at which switch 36 is returned to neutral position, are ordinarily somewhat lower, as represented illustratively by the lines 134 and 135.

Following initiation of forward drive at time t1, driven member 20 is rapidly accelerated, as at 137. When the initial error is large, as at 131, the drive typically attains a constant speed, represented by the slope of the straight portion 138 of curve 130. Net control signal S3 diverges downward from error signal S5 as stabilizing signal S6 increases. That increase may be gradual, as illustrated, or may be quite rapid, depending upon selection of the components of charging network 74 and other circuit factors (FIG. 2). In the present instance, control signal S3 reaches drop-out level 134 at time t2. Forward drive is thereby terminated while driven member 20 is still at the point 146, some distance short of the command position.

After forward drive termination at t2, the inertia of the driven member 20 and drive mechanism 40 typically causes the mechanism to coast, as represented by the solid curve 147. The curvature of curve 147 depends upon the effective damping. In previous systems, such coasting tended to produce serious overshoot, as indicated by the projected curve 148. Without the present improvement such overshoot would, at best, initiate reverse drive when line 148 intersects reverse drive threshold 133, as at 149.

With the improved stabilizing mechanism of the present invention, stabilizing signal S6 decays relatively slowly following deletion of power at t2 (curves 122 and 123 in FIG. 3C). The net control signal S3 therefore continues to differ considerably from error signal S5 during the coasting phase of the mechanism, as shown at 142. Moreover, while driven member 20 is still short of its command position that net control signal typically changes phase, represented in FIG. 3D by crossing the abscissa, and can then initiate reverse drive. As illustrated, such reverse drive is initiated at t3 when control signal 142 reaches threshold 133.

The resulting reverse drive quickly decelerates the driven member, and ideally brings it to a full stop at the command position, as represented by the relatively sharp curve 150, tangent to the abscissa in FIG. 3D. At the same time, stabilizing signal S6 is rapidly reduced in value due to charging of capacitance 83 in reverse channel 80 (FIG. 2) as already explained and as illustrated by the curve 127 in FIG. 3C. The corresponding decrease of the net control signal S3 is shown at 143 in FIG. 3D. When that signal reaches drop-out level 135 at time t4, the reverse drive is terminated. With appropriate selection of parameters, that occurs just as the driven member comes to rest at the command position.

The driven member is thus driven at full speed to a position (146) short of the command position, and its coasting movement is positively braked by reverse energization of the driving means without overshoot. In actual practice, since the servo sensitivity is necessarily limited by the separation of thresholds 132 and 133, satisfactory operation requires only that the driven member be brought to rest within that range, rather than precisely at the ideal position as illustrated.

The initial deviation of driven element 20 from desired position may be relatively small, so that point 131 of FIG. 3D is not far above threshold 132. The invention then causes drive means 24 to be pulsed only momentarily, since net control signal S3 quickly becomes smaller than drop-out level 134 (when curve 140 crosses line 134). The drive is then typically terminated before attaining appreciable speed, and the mechanism may even stop short of the deadband, between lines 132 and 133. In that case, discharge of capacitor 73 (FIG. 2) soon causes signal S2 to again exceed threshold 132, producing a second drive pulse. The resulting step-wise approach to the desired position approximates action of a Lanchester damper for small amplitudes.

In the preceding discussion of FIG. 3, stabilizing signal S6 has been described as modifying input signal S3 to servo amplifier 40. Signal S6 may also be viewed as altering the threshold levels of signal S5 to which the amplifier responds. From the latter viewpoint, the stabilizing signal produced by drive in one direction will be seen to increase the threshold value for signal S5 required to produce or maintain drive in that direction; and to decrease the threshold value required for producing or maintaining drive in the opposite direction.

The embodiment that has been described is intended only as illustration, and may be modified in many ways without departing from the true scope of the present invention. As an example, the forward and reverse component voltages on lines 72 and 82 may be supplied to separate modulators, indicated schematically at 90a and 90b in FIG. 4. Each of those modulators, which may be of conventional form, modulates reference frequency S2 received via line 91. The resulting alternating current component signals on the lines 62a and 62b are then summed by a suitable summing device indicated schematically at 99, to produce the final stabilizing signal S6 on line 62.

FIG. 5 represents a further illustrative modification, in which switching mechanism 30a comprises two distinct relays 150 and 152. Relays 150 and 152 are actuated by respective forward and reverse signals from amplifier 40 on lines 42 and 44. They supply power via one set of switches a to the respective lines 32 and 34 to energize drive mechanism 24a for forward and reverse drive, respectively; and supply power via a second set of switches b to the respective lines 71 and 81 to control stabilizer circuit 60a. With that switching arrangement, circuit 60a is completely isolated from drive mechanism 24a. Power for forward and reverse drive may be of opposite polarity, typically derived from the oppositely poled batteries 35a and 35b, respectively. Also, the power supplied as control signal to stabilizing circuit 60a may be independent of that employed for energizing drive mechanism 24a. In the present embodiment, forward and reverse signal voltages on lines 71 and 81 are of opposite polarity, like the drive voltages at 32 and 34, but are derived from taps on batteries 35a and 35b, permitting independent selection of the voltage values.

In stabilizing circuit 60a of FIG. 5 the previously described power storage devices for developing forward and reverse components of the stabilizing signal S6, represented at 73 and 83 in FIG. 2, are consolidated in the single capacitance 160. Separate charging networks are provided for charging that capacitance positively in response to actuation of forward drive relay 150 and for charging it negatively in response to actuation of reverse drive relay 152. The forward charging network comprises the resistance 162 and the diode 163 and corresponds to network 74 of FIG. 2; and the reverse charging network comprises the resistance 164 and the diode 165 and corresponds to network 84 of FIG. 2. A single discharge network, shown in FIG. 5 as the resistance 166 connected in shunt to capacitance 160 performs functions analogous to those of discharge networks 78 and 88 in FIG. 2. The voltage standing on capacitance 160, which may be either positive or negative with respect to ground, is supplied via the line 172 as control signal to the modulator 90c. That modulator receives the reference voltage S2 via line 91 and modulates that voltage, producing on line 62 a stabilizing signal S6 which varies in amplitude with the control signal and is in phase with S2 when the control signal is positive, say, and of opposite phase when the control signal is negative. Modulator 90c may, for example, be like modulator 90 of FIG. 2 with line 82 grounded and the control signal supplied via line 72.

The time variation of the stabilizing signal produced by the system of FIG. 5 is basically like that explained in connection with FIG. 3. Curves 121 and 122 of FIG. 3C may be considered to represent the voltage on capacitance 160 produced by charging through resistance 162 and discharging through resistance 166, respectively. However, when reverse drive is initiated at time t3 the voltage across reverse charging resistance 164 is not merely that from battery 35b, but is the sum of that battery voltage plus the residual voltage remaining on capacitance 160. The resulting current flow is higher than that corresponding to curve 124 of FIG. 3C. The rate of potential change during reverse drive is therefore similar to curve 127, but somewhat steeper.

I claim:

1. In combination with servo control means comprising reversible driving means and switching means actuable under control of an input signal to two alternative operating conditions to energize the driving means in respective driving directions, the switching means being normally responsive to a definite threshold value of the input signal; means for developing respective stabilizing signals in response to drive energization in the two directions, and means acting under control of each of the stabilizing signals to increase said threshold value for drive in the direction of the drive energization, and to decrease said threshold value for drive in the direction opposite to the drive energization.

2. In combination with servo control means comprising reversible driving means and switching means actuable under control of an alternating current input signal to two alternative operating conditions to energize the driving means in respective driving directions; means for developing a direct current signal in response to drive energization in one direction, means for producing a modulated alternating current stabilizing signal that has a definite phase relation to the input signal and varies in amplitude in accordance with the direct current signal, and means for modifying the input signal under control of the stabilizing signal.

3. In combination with servo control means comprising reversible driving means and switching means having a neutral condition and actuable in response to an alternating current input signal to two alternative operating conditions to energize the driving means in the respective driving directions; energy storage means having two input channels, means for supplying energy to said input channels in response to the operating conditions of the respective switching means, means for producing an alternating current stabilizing signal differentially responsive to the energy stored in the storage means via the respective channels, and means for modifying the input signal under control of the stabilizing signal.

4. In combination with a servo system for driving a movable member in response to an alternating current control signal, said system comprising reversible driving means and switching means actuable to energize the driving means in respective directions under control of an input signal; means for developing two voltages in response to actuation of the switching means in the respective directions, means for developing an alternating current stabilizing signal having a definite phase relation to said control signal and varying in magnitude under joint control of said voltages, means for summing the stabilizing signal and the control signal to produce a modified alternating current signal, and means for supplying the modified signal as input signal for control of the switching means.

5. In combination with a servo system for driving a movable member in response to an alternating current control signal, said system comprising reversible driving means and switching means actuable to energize the driving means in respective directions under control of an input signal; means for developing two voltages in response to actuation of the switching means in the respective directions, means for developing a first alternating current signal component that is in phase with said control signal and that varies in magnitude under control of drive actuation in one direction, means for developing a second signal component that is out of phase with said control signal and that varies in magnitude under control of drive actuation in the other direction, means for summing the signal components and the control signal to produce a modified alternating current signal, and means for supplying the modified signal as input signal for control of the switching means.

6. In combination with a servo system for driving a movable member in response to an alternating current control signal, said system comprising reversible driving means and switching means actuable to energize the driving means in respective directions under control of an input signal; means for developing two voltages in response to actuation of the switching means in the respective directions, said voltages increasing with one rate constant in response to switching means actuation and decreasing with a second rate constant in response to switching means deactuation, means for developing an alternating current stabilizing signal having a definite phase relation to said control signal and varying in magnitude under joint control of said voltages, means for summing the stabilizing signal and the control signal to produce a modified alternating current signal, and means for supplying the modified signal as input signal for control of the switching means.

7. In combination with a servo system for driving a movable member in response to an alternating current control signal, said system comprising reversible driving means and switching means actuable to energize the driving means in respective directions under control of an input signal; capacitance means, two charging circuit means for charging the capacitance means under control of switch actuation in the respective driving directions, means for producing an alternating current stabilizing signal differentially responsive to the charge stored in the capacitance means via the respective charging circuit means, means for summing the stabilizing signal and the control signal to produce a modified alternating current signal, and means for supplying the modified signal as input signal for control of the switching means.

References Cited in the file of this patent

UNITED STATES PATENTS

| | | |
|---|---|---|
| 2,425,733 | Gille et al. | Aug. 19, 1947 |
| 2,454,401 | Nygaard | Nov. 23, 1948 |
| 2,460,276 | Bernas | Feb. 1, 1949 |
| 2,475,461 | Roberts | July 5, 1949 |
| 2,534,801 | Siltamaki | Dec. 19, 1950 |
| 2,849,667 | McMullen | Aug. 26, 1958 |